US011244316B2

(12) United States Patent
Darnell et al.

(10) Patent No.: US 11,244,316 B2
(45) Date of Patent: Feb. 8, 2022

(54) BIOMETRIC TOKEN FOR BLOCKCHAIN

(71) Applicant: International Business Machines Corporation, Armonk, NY (US)

(72) Inventors: Shelby Solomon Darnell, Nairobi (KE); Karthik Nandakumar, Singapore (SG); Sharathchandra Pankanti, Fairfield County, CT (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 16/002,191

(22) Filed: Jun. 7, 2018

(65) Prior Publication Data
US 2019/0378142 A1    Dec. 12, 2019

(51) Int. Cl.
*G06F 21/32*    (2013.01)
*G06Q 20/40*    (2012.01)
(Continued)

(52) U.S. Cl.
CPC ....... *G06Q 20/40145* (2013.01); *G06F 21/32* (2013.01); *G06Q 20/102* (2013.01);
(Continued)

(58) Field of Classification Search
CPC ........... G06Q 20/40145; G06Q 20/102; G06Q 20/407; G06F 21/32; H04L 9/0637; H04L 63/12; H04L 2209/38
(Continued)

(56) References Cited

U.S. PATENT DOCUMENTS 9,123,044 B2    9/2015    Keane et al.
9,237,018 B2    1/2016    Popowski
(Continued)

FOREIGN PATENT DOCUMENTS

WO    2017044554 A1    3/2017

OTHER PUBLICATIONS

Baars, Djuri; "Towards Self-Sovereign Identity Using Blockchain Technology", University of Twente, Jun. 23, 2016, pp. 1-90.
(Continued)

*Primary Examiner* — John W Hayes
*Assistant Examiner* — Wodajo Getachew

(57) ABSTRACT

An example operation may include one or more of obtaining a first biometric sample of a user from a user device, extracting, by an issuing node of a permissioned blockchain network, a biometric template from the first biometric sample, encrypting the biometric template, distributing an issuetoken proposal comprising the encrypted biometric template to the blockchain network, and generating and distributing a biometric token to the user device. In response to the user indicating to the user device to redeem the biometric token, the method includes one or more of presenting, by the user device, the biometric token to a verifying node of the blockchain network, validating, by the verifying node, the biometric token, receiving, by the verifying node, a second biometric sample from the user device, distributing a redeemtoken proposal to the blockchain network, committing a transaction corresponding to the biometric token, to the blockchain network, and invalidating the biometric token.

6 Claims, 12 Drawing Sheets

142

(51) Int. Cl.
*G06Q 20/10* (2012.01)
*H04L 9/06* (2006.01)
*H04L 29/06* (2006.01)

(52) U.S. Cl.
CPC ......... *G06Q 20/407* (2013.01); *H04L 9/0637* (2013.01); *H04L 63/12* (2013.01); *H04L 2209/38* (2013.01)

(58) Field of Classification Search
USPC .......................................................... 705/64
See application file for complete search history.

(56) References Cited

U.S. PATENT DOCUMENTS

| | | | |
|---|---|---|---|
| 9,384,338 | B2 | 7/2016 | Kevenaar et al. |
| 9,509,690 | B2 | 11/2016 | Carter et al. |
| 9,659,297 | B2 | 5/2017 | Russell et al. |
| 9,785,369 | B1 | 10/2017 | Ateniese et al. |
| 2016/0019538 | A1 | 1/2016 | Arif |
| 2017/0132630 | A1 | 5/2017 | Castinado et al. |
| 2017/0134375 | A1 | 5/2017 | Wagner |
| 2017/0279801 | A1 | 9/2017 | Andrade |
| 2017/0293912 | A1 | 10/2017 | Furche et al. |
| 2017/0316497 | A1 | 11/2017 | Song et al. |
| 2018/0285879 | A1* | 10/2018 | Gadnis ................ G06F 16/1805 |
| 2019/0109709 | A1* | 4/2019 | Wu ....................... H04L 9/3236 |

OTHER PUBLICATIONS

Gaikawad et al.; "Multi-Biometric Cryptographic Security System With Dynmaic Password Protection", IJSR Journal, vol. 5, Issue 12, Dec. 2016, pp. 1999-2004.

Lac, Gary; "Interoperability of Biometrics Using Blockchain", IBM Global Sevices Biometrics & Identity Management, 2017, pp. 1-9.

Mougayar, William; "Smart Identity Token Sale: Identity Authentication With Privacy on the Blockchain", AutenticID Incorporation, Oct. 2017, pp. 1-26.

* cited by examiner

BIOMETRIC TOKEN FOR BLOCKCHAIN

TECHNICAL FIELD

This application generally relates to blockchain networks, and more particularly, relates to biometric tokens for blockchains.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to a blockchain ledger, all peers need to reach a consensus status.

Conventionally, transactions involving humans are subject to repudiation claims because the user can easily deny a transaction by claiming his credentials were stolen. As such, what is needed is a more secure and reliable process and system to overcome these limitations.

SUMMARY

One example embodiment may provide a system that includes one or more of a user device, including one or more biometric sensors, and a permissioned blockchain network. The permissioned blockchain network includes one or more of an issuing node and a verifying node. The issuing node is configured to perform one or more of receive a first biometric sample from the user device, extract a biometric template from the first biometric sample, encrypt the biometric template, distribute an issuetoken proposal to the blockchain network based on the encrypted biometric template, and generate and distribute a biometric token to the user device. The verifying node, in response to the user indicating to the user device to redeem the biometric token, is configured to perform one or more of receive the biometric token from the user device, validate the biometric token, receive a second biometric sample from the user device, and distribute a redeemtoken proposal to the blockchain network. The blockchain network is configured to commit a transaction corresponding to the biometric token and invalidate the biometric token.

An example operation may include one or more of obtaining a first biometric sample of a user from a user device, extracting, by an issuing node of a permissioned blockchain network, a biometric template from the first biometric sample, encrypting the biometric template, distributing an issuetoken proposal comprising the encrypted biometric template to the blockchain network, and generating and distributing a biometric token to the user device. In response to the user indicating to the user device to redeem the biometric token, the method may include one or more of presenting, by the user device, the biometric token to a verifying node of the blockchain network, validating, by the verifying node, the biometric token, receiving, by the verifying node, a second biometric sample from the user device, distributing a redeemtoken proposal to the blockchain network, committing a transaction corresponding to the biometric token, to the blockchain network, and invalidating the biometric token.

A further example embodiment may provide a non-transitory computer readable medium comprising instructions, that when read by a processor, cause the processor to perform one or more of obtaining a first biometric sample of a user from a user device, extracting, by an issuing node of a permissioned blockchain network, a biometric template from the first biometric sample, encrypting the biometric template, distributing an issuetoken proposal comprising the encrypted biometric template to the blockchain network, and generating and distributing a biometric token to the user device. In response to the user indicating to the user device to redeem the biometric token, a processor performs one or more of presenting, by the user device, the biometric token to a verifying node of the blockchain network, validating, by the verifying node, the biometric token, receiving, by the verifying node, a second biometric sample from the user device, distributing a redeemtoken proposal to the blockchain network, committing a transaction corresponding to the biometric token, to the blockchain network, and invalidating the biometric token.

DETAILED DESCRIPTION

Figure 1A:
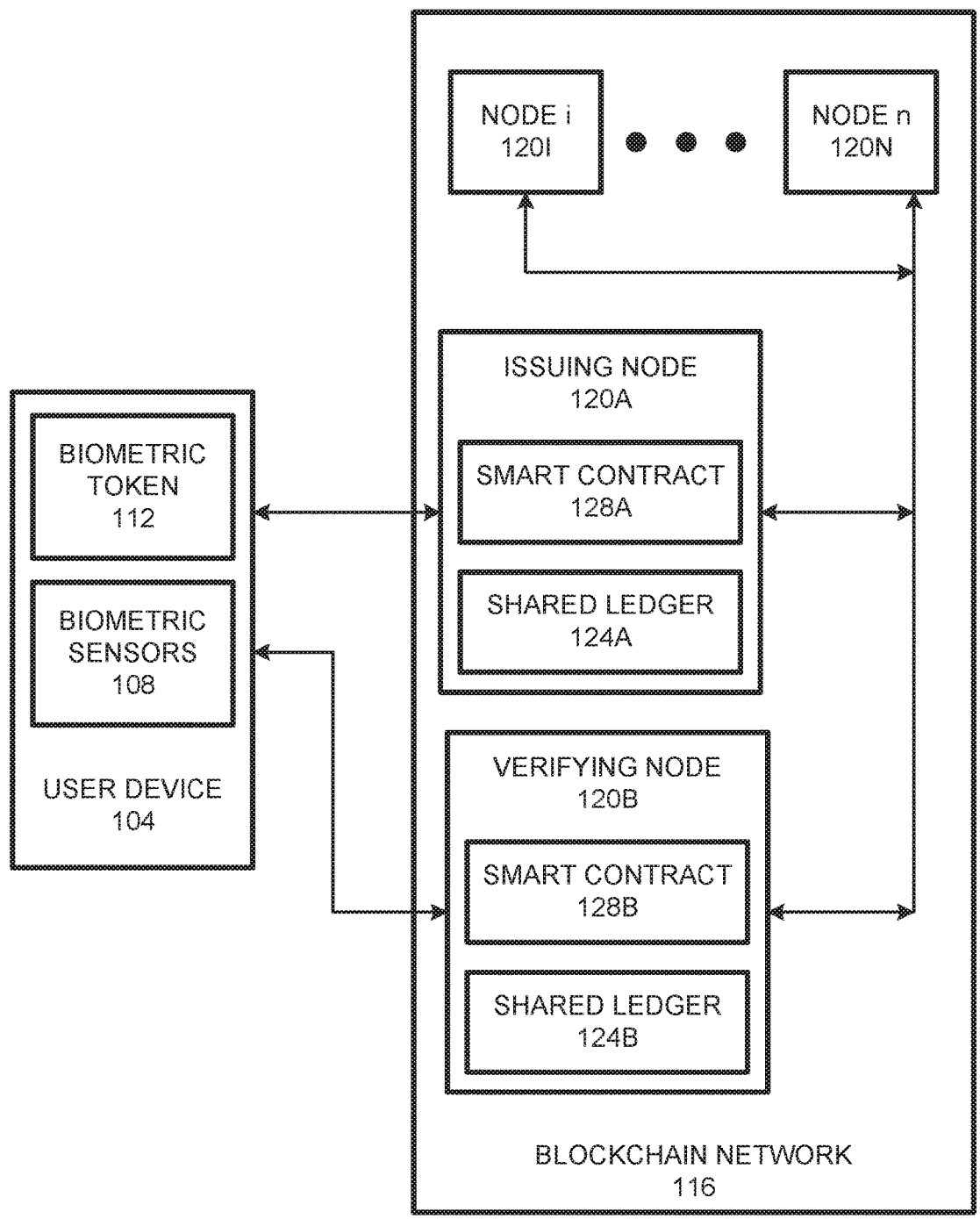
FIG. 1A illustrates a logic network diagram of a permissioned blockchain network, according to example embodiments.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiments. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The instant application in one embodiment relates to blockchain networks, and more in another embodiment relates to providing biometric tokens for secure transaction authentication on a distributed ledger (such as a blockchain).

Example embodiments provide methods, devices, networks and/or systems, which support issuing, redeeming, and revoking biometric tokens on permissioned blockchain networks. Before proceeding to describing the proposed solution, the choice of blockchain implementation that can be used is discussed. While many implementations of blockchain technology for generic transactions are available (e.g., Ethereum), the present application employs a permissioned blockchain network, where the blockchain nodes are operated by known whitelisted entities. The identities for these entities (often defined by public and private key pairs) are granted by an issuing authority on the network. One example of such a permissioned blockchain network is the open-source Hyperledger Fabric. Fabric has a modular architecture that allows network administrators to define their own constraints and then set-up the protocols accordingly. Fabric also provides the following special features, some of which are herein.

Chaincode extends the concept of traditional smart contracts. Apart from providing a mechanism to define assets and instructions (business logic) to modify the assets, chaincode is also immutable, may retain state, and inherits confidentiality/privacy. Networks can limit who can view or interact at different levels of the environment (variable confidentiality). Individual transactions can even impose their own confidentiality rules. While the network can set identity obfuscation, it is possible to have 100% anonymous peers whose identity is also provable and unique with secure cryptographic techniques (variable identification). If the users of a network grant permission, an auditor will be able to de-anonymize users and their transactions. This is useful for regulatory inspection and analysis. The details of a transaction, including but not limited to chaincode, peers, assets, and volumes are encrypted (private transactions). This eliminates any pattern recognition or leaked private information to nonauthorized actors on the network. Only specified actors can decrypt, view and interact/execute (with chaincode). Finally, fabric can easily operate with almost any consensus mechanism.

FIG. 1A illustrates a logic network diagram of a permissioned blockchain system, according to example embodiments. Referring to FIG. 1A, the system 100 includes one or more user devices 104. A user is associated with user device 104. Although only one user device 104 is illustrated, it should be understand that any number of user devices 104 may be present in system 100. User device 104 is any sort of computing device, and includes but is not limited to a server, a desktop computer, a portable or mobile computer including laptops, notebook computers, tablets, smart phones, wearable computers, embedded computers, and the like.

User device 104 includes one or more biometric sensors 108, which includes cameras, fingerprint sensors, retinal sensors, microphones, thermal sensors, electromagnetic sensors, and associated software to enable the user device 104 to record and store one or more biometric samples of the user. In one embodiment, biometric sensors 108 are contained within user device 104. In another embodiment, biometric sensors 108 are not included in user device 104 but are coupled to user device 104 through one or more appropriate communication connections. In yet another embodiment, some biometric sensors 108 are contained within user device 104 while other biometric sensors 108 are not included in user device 104 but are coupled to user device 104 through one or more appropriate communication connections. At various times, user device 104 may store one or more biometric tokens 112, which are described herein in more detail.

The single-use biometric token with limited expiry uses a permissioned blockchain network 116, which is composed of a set of N nodes or peers 120. It is assumed that every organizational entity involved in a transaction is represented by a node 120 in the blockchain network 116. For instance, in a flight boarding scenario, the nodes 120 could consist of the airlines operating from an airport, the airport operator, immigration control authority, the organization that provides security screening, etc. In fact, every check-in counter and boarding gate at the airport can also be included as peers/nodes 120 in the blockchain network 116. Each node 120 in the blockchain network 116 has a copy of the shared replicated ledger 124 as well as a chaincode service. Furthermore, each node 120 has two public-private key pairs, one for ensuring the confidentiality of transaction (i.e., encryption and decryption) and the other for signing the transactions. While the public and private (secret) keys used for encryption are denoted as EPK and ESK, respectively, the corresponding signing keys are denoted as SPK and SSK, respectively. It is reasonable to assume that every node 120 has knowledge of the public encryption and signing keys (EPK and SPK, respectively) of all the other nodes 120 in the blockchain network 116. Three types of transactions are possible: (i) IssueToken, (ii) RedeemToken, and (iii) RevokeToken.

User devices 104 are coupled to a blockchain network 116 through any known means. Although separate connections are shown between user device 104 and issuing node 120A and verifying node 120B, it should be understood that these are logical connections, and may be combined or separated in any known fashion. Blockchain network 116 may include any number of nodes or peers 120. In one embodiment, the issuing node 120A and verifying node 120B are separate nodes 120. In other embodiments, the issuing node 120A and verifying node 120B are the same node 120. Blockchain network 116 may also include other nodes 120, identified as node I 120I through node n 120N. Any of the nodes 120 may have a role in processing transactions from the user device 104.

Issuing node 120A includes a smart contract 128A and a smart ledger 124A as understood in blockchain technology. Issuing node 120A processes initial biometric samples from user devices 104 (i.e. enrollment samples), and processes the steps required to generate (issue) biometric tokens.

Verifying node 120B includes a smart contract 128B and a smart ledger 124B as understood in blockchain technology. Verifying node 120B receives biometric token redemption requests from user devices 104 and requests biometric samples from user device 104 (i.e. authentication samples), and processes the steps required to validate (redeem) biometric tokens.

Every blockchain node or peer 120 is connected to a middleware layer 144, 172 that has the capabilities to create, redeem, and revoke the biometric tokens. Depending on the context, the middleware layer 144, 172 connected to a blockchain node or peer 120 can be configured to perform one or more of the functions associated with the biometric tokens. For instance, some peers 120A may be able to only issue biometric tokens (e.g., check-in counter), while others 120B may be able to only redeem the biometric tokens (e.g., boarding gate). However, a node 120 linked to a manager with administrative authority may have all three capabilities. The middleware layers 144, 172 run on a hardware security module in order to ensure that there is no leakage of biometric and cryptographic key information during processing. Finally, the users interact with the middleware layers 144, 172 through a user interface, which also includes biometric sensors 108 to capture the biometric trait(s). The user interface could be a kiosk, a personal computer, or other personal electronic devices (e.g., smartphones or tablets).

Figure 1B:
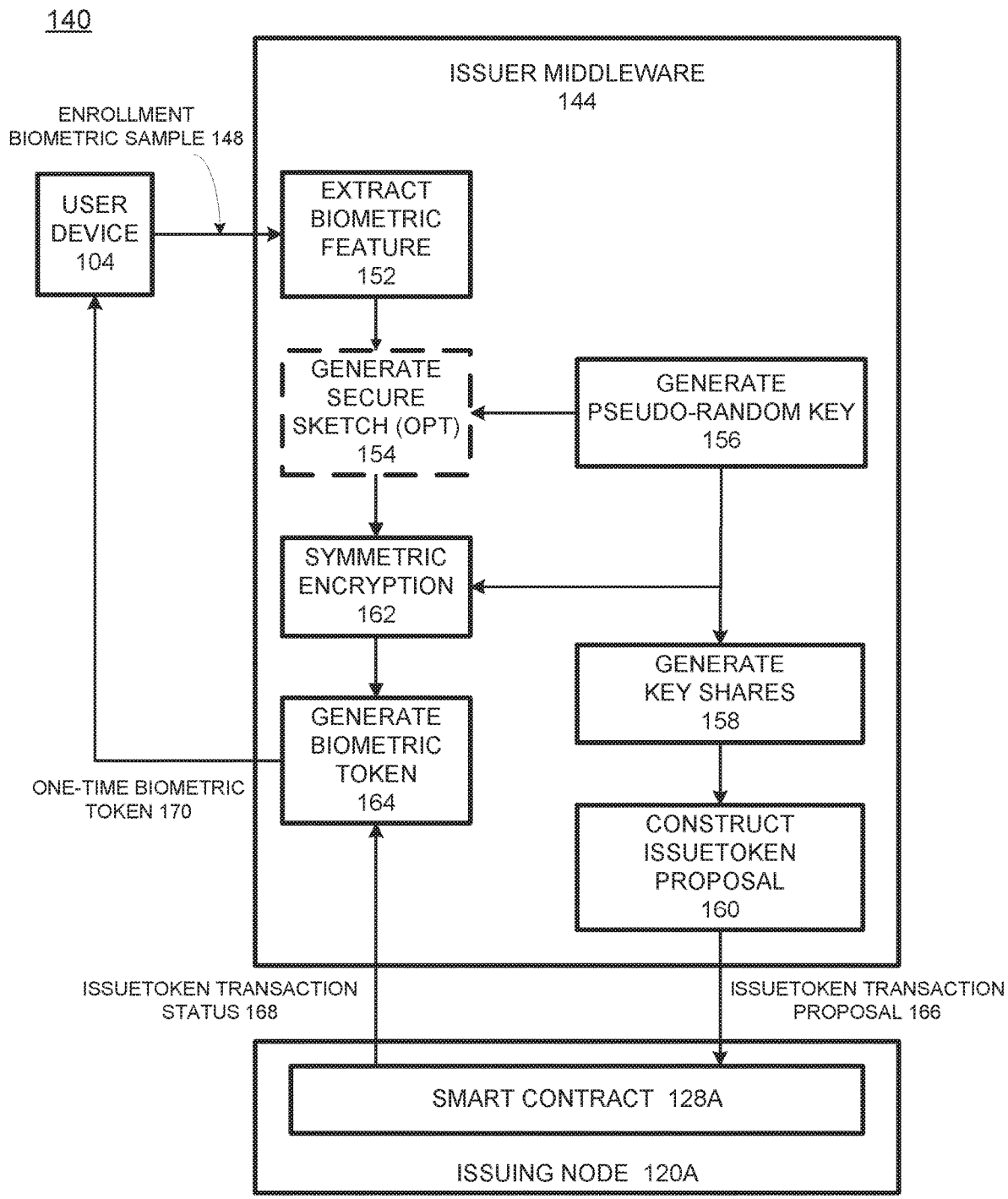
FIG. 1B illustrates a logic network diagram of biometric token issuance, according to example embodiments.

FIG. 1B illustrates a logic network diagram 140 of biometric token issuance, according to example embodiments. FIG. 1B assumes previous execution of a process to receive a transaction from a user device 104, perform identity verification and other validation checks (e.g., payment processing) including determining the blockchain network 116 can perform the transaction, prior to issuing a token. Referring to FIG. 1B, the elements involved with issuing biometric tokens 170 are illustrated. FIG. 1B includes replacing the existing token (e.g., a boarding pass or event ticket) with a new single-use biometric token.

Once the prior validation checks have been completed, a unique transaction ID is assigned to the transaction. Issuer middleware 144 requests the user to provide an enrollment biometric sample 148. The user produces the first or enrollment biometric sample 148 through biometric sensors 108 associated with the user device 104. After recording the enrollment or first biometric sample 148, the user device 104 transfers the biometric sample 148 to the issuer middleware 144.

The enrollment biometric sample 148 is processed by a feature extractor 152 to extract a biometric template. A pesudo-randomkey generator 156 is used to randomly generate a cryptographic key K1, which is then employed to encrypt the biometric template using a symmetric encryption 162 algorithm (e.g., AES). The well-known Shamir's (M,N) threshold secret sharing algorithm is used to divide the key K1 into N shares 158. Each share 158 of the secret is encrypted using the public encryption key of blockchain mode or peer 120 to generate the secret share set. A timestamp of the time of enrollment is recorded, as well as an expiry time for the expiration of the biometric token 170. After the expiry time, the biometric token 170 is invalidated and unable to be redeemed. A token ID is generated by concatenating the key K1 with the expiry timestamp and computing a cryptographic hash of this concatenated value. A token status 168 is set to a value of 1, indicating that the biometric token 170 is valid.

Two further steps are required to complete biometric token 170 issuance. First, an IssueToken transaction proposal 166 is constructed 160 containing the following elements: token ID, a transaction ID, a token status 168, a time of enrollment, a time of expiry, and a cryptographic hash of the encrypted biometric template, and the secret share set. The IssueToken transaction proposal 166 is submitted by the issuer middleware layer 144 to the issuing node 120A, which in turn broadcasts it other nodes 120 in the blockchain network 116. After signing the IssueToken transaction proposal 166 using its private signing key, chaincode running on the blockchain nodes 120 verifies the validity of the IssueToken transaction proposal 166 by checking if the IssueToken transaction proposal 166 has been signed by a genuine blockchain node 120 and if the expiry timestamp in the IssueToken transaction proposal 166 is greater than the enrollment time, but less than the current time. If the proposal is found to be valid, the transaction is committed to the blockchain and added to the shared ledger 124, following the consensus protocol.

Once the blockchain network 116 successfully records the IssueToken transaction proposal 166 in the shared ledger 124, transaction metadata is constructed by including the following elements: the issuing node 120A ID, the token ID, the transaction ID, the time of enrollment, the time of expiry, and the encrypted biometric template. The transaction metadata is encrypted using the issuing node 120A private encryption key and signed using the issuing mode 120A private signing key. The encrypted transaction metadata along with the digital signature constitutes the single use biometric token with limited expiry 170.

The resulting biometric token 170 is then issued to the user device 104 and stored by the user on the user device 104. Once the biometric token 170 is issued to the user, the issuer middleware 144 securely erases all the intermediate data generated while issuing the biometric token 170. Except for data stored in the blockchain, no other information about the biometric token 170 is stored by the issuing node 120A either in the middleware layer 144 or in its local cache. However, the issuing node 120A may store the transaction ID and other information linked to the transaction (e.g., payment details). It is possible to incorporate an additional layer of protection by applying traditional biometric template protection schemes such as feature transformation or biometric cryptosystem on the biometric template prior to encrypting it using key K1. In this case, a new randomly generated key K2 can be used to define the transformation parameters of a feature transformation scheme or be bound to the biometric template (after adding error correction bits) to form a secure sketch. For feature transformation, the key K2 can be made a part of the transaction metadata. For biometric cryptosystems, H(K2) can be stored in the token.

Figure 1C:
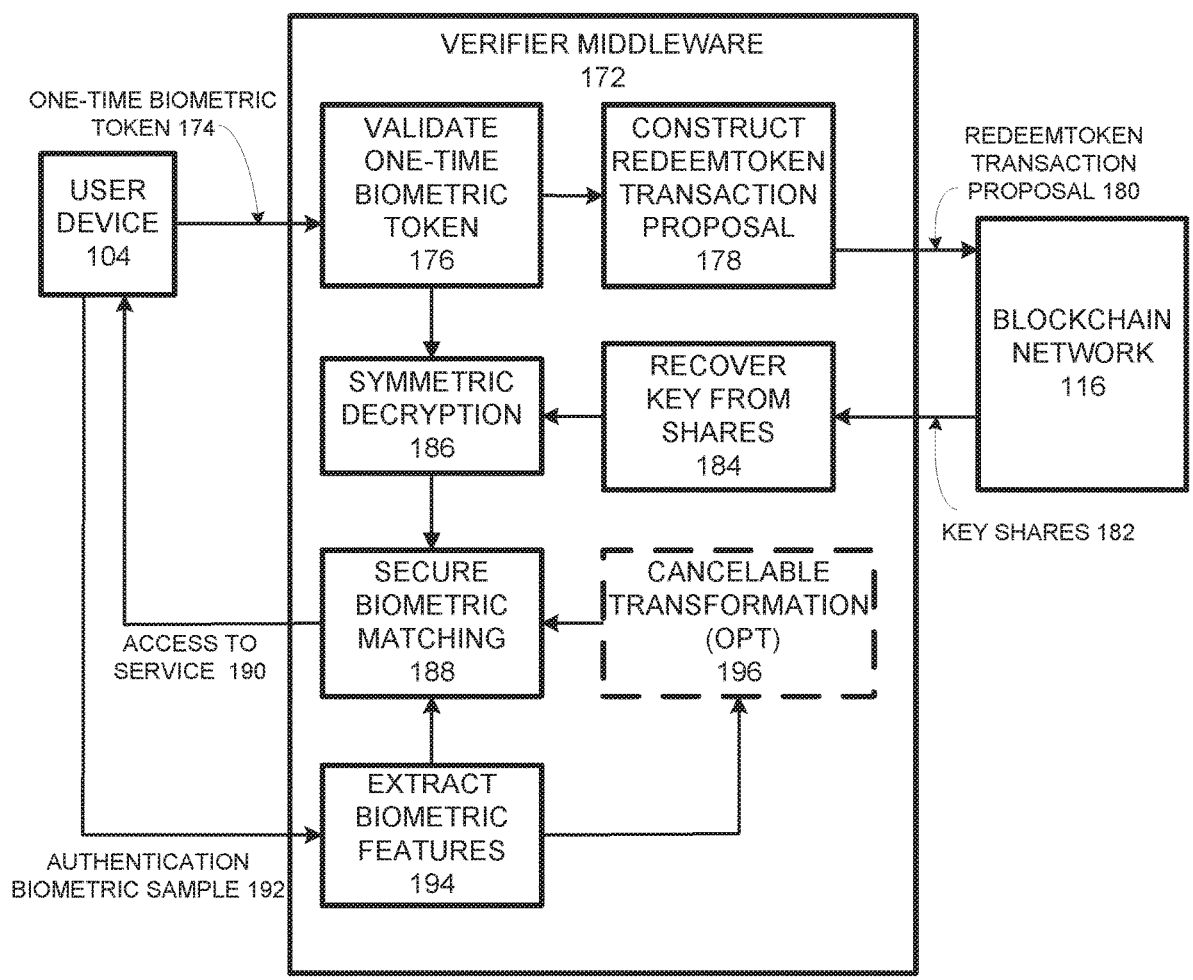
FIG. 1C illustrates a logic network diagram of biometric token redemption, according to example embodiments.

FIG. 1C illustrates a logic network diagram 142 of biometric token redemption, according to example embodiments. Referring to FIG. 1C, the elements involved with redeeming biometric tokens 174 are illustrated. When a user wants to redeem the biometric token to access a service, he/she presents the one-time biometric token 174 to a verifying node 120B of the blockchain network 116 via a user interface. Note that the verifying node 120B need not be the same as the issuing node 120A. The verifying node 120B has a corresponding middleware layer 172 that performs a series of checks to validate 176 the received biometric token 174. First, the verifier middleware 172 checks the integrity of the biometric token 174 by decrypting the transaction metadata using the issuing node's 120A public encryption key and comparing it against the associated signature. Second, the verifier middleware 172 compares the time of expiry with the current time to determine if the biometric token 174 has expired. Next, the verifier middleware 172 queries the shared ledger 124 based on the token ID to ensure that the biometric token 174 has not been redeemed or revoked earlier. Finally, the verifier middleware 172 computes a cryptographic hash of the encrypted biometric template for the biometric token 174 and compares it with a hash stored in the blockchain during biometric token issuance 170. If all the above checks are successfully cleared, the user is requested to provide a second or authentication biometric sample 192. This sample 192 is processed by the feature extractor 194 to extract a biometric query. If the biometric template has been protected using a feature transformation approach, the query is also transformed using the transformation key K2 retrieved from the biometric token 174.

The verifier middleware 172 constructs 178 a RedeemToken transaction proposal 180 containing the following elements: the token ID, the transaction ID, a request type, the time of enrollment, the time of expiry, and a cryptographic hash of the biometric query. The request type is a binary variable, which is set to 1 for a redemption transaction and 0 for a revocation transaction. This RedeemToken transaction proposal 180 is submitted by the verifier middleware 172 to the verifying node 120B, which in turn broadcasts it other nodes 120 in the blockchain network 116 after signing it using its private signing key. Chaincode running on the blockchain nodes 120 verify the validity of the RedeemToken transaction proposal 180 by checking if the transaction proposal 180 has been signed by a genuine blockchain node 120, if the expiry timestamp in the proposal is later than the current time, and if the token status in the shared ledger 124 is still valid. If the RedeemToken transaction proposal 180 is found to be valid, the transaction is committed to the blockchain following the consensus mechanism. The chaincode service automatically ensures that the status associated with the given token ID is set to −1 to indicate that the biometric token 174 has been redeemed. The nodes 120 in the blockchain network 116 decrypt their share of secret using their own private encryption key, re-encrypt the resulting share using the verifying node 120B public encryption key, and broadcast the re-encrypted shares back to the blockchain network 116. The shared ledger 124 is updated with the newly encrypted secret share set. Note that the number of shares available in the new secret share set is R, which may be less than N because some nodes 120 may be faulty or malicious. As long as R exceeds M, the threshold selected in the secret sharing scheme, the redemption would be successful. Once the blockchain network 116 successfully records the Redeem-Token transaction in the shared ledger 124, the verifying node 120B can retrieve the secret shares 182 from the shared ledger 124 and pass it to the verifying middleware layer 172. The verifying middleware layer 172 can reconstruct the secret K1 184 if sufficient shares are available and use it to decrypt 186 the biometric template. A biometric matcher 188 is invoked to compare the biometric template against the query and if the match scores exceeds a preset threshold, the user is granted access to the service 190.

Note that if the biometric template had been protected using the feature transformation transformation 196 approach, the biometric matching 188 takes place in the transformed domain. On the other hand, if a biometric cryptosystem had been employed for template protection, error correction schemes are applied to recover the secret K2. A freshly computed hash of K2 is compared against the stored hash on the biometric token 174 to determine if the match is successful. Note that even if the redemption is not successful from the user's perspective (either because sufficient shares of the secret are not available from the blockchain network 116 or if the biometric matcher 188 provides a reject decision), the biometric token 174 is considered as redeemed from the perspective of the blockchain network 116. Therefore, it is not possible to re-use the biometric token 174 again at a later time. This may cause some inconvenience (denial of service) to genuine users if they are falsely rejected by the biometric system or if their biometric token 174 is stolen by an adversary who attempts to redeem the biometric token 174 using his/her own biometric trait. To mitigate this problem, the middleware layer 172 of the verifying node 120B may be allowed to temporarily retain the decrypted biometric template for a very short period of time (e.g., up to five minutes) and the user presenting the biometric token 174 may be allowed a limited number of attempts (e.g., 3) to present his/her biometric sample 192. If multiple authentication attempts are involved, the details of these attempts (a cryptographic hash of each biometric sample 192 acquired from the user and the corresponding match score/decision) should be recorded on the blockchain by the verifying node 120B. This will strengthen the forensic evidence in the case of a future dispute and anomalies in the authentication patterns can enable detection of possible adversary attacks. Once the redemption attempt has been completed, the verifying node 120B securely erases all the intermediate data generated while redeeming the biometric token 174.

The need to revoke the biometric token 174 may arise due to three reasons. First, a genuine user may want cancel his/her transaction after the biometric token 170 has been issued. In this case, the same process described for redemption is followed, except that the request type field in the RedeemToken transaction proposal 180 is set to 0, to indicate revocation. During the revocation process, the token status is set to 0 on the blockchain to indicate that the biometric token 170 has been revoked and not redeemed. Second, if a genuine user suspects that his/her biometric token 170 has been stolen/copied by an adversary, who is yet to redeem it. Since the genuine user still has access to his/her valid biometric token 170, a combination of RedeemToken 180 (with request type set to 0) and IssueToken 166 transactions can be performed to revoke and reissue a new biometric token 170 based on the same biometric data (one can reuse the same biometric template recovered during the RedeemToken transaction 180 to carry out the IssueToken 166 transaction). Finally, there may be a scenario where a genuine user has completely lost access to his/her biometric token 170. In this case, the user will need to attempt to retrieve the token ID, time of enrollment, time of expiry, and transaction status from the blockchain by querying based on the issuing node 120A ID and transaction ID. If the biometric token 170 is still found to be valid, the issuing node 120A needs to perform the same identity verification and validation checks conducted prior to biometric token 170 issuance. Upon successful completion of these checks, the issuer middleware layer 144 can construct a RevokeToken transaction proposal containing the following elements: the token ID, the transaction ID, the time of enrollment, and the time of expiry. After the RevokeToken transaction proposal is committed to the blockchain network 116, the issuing node 120A can issue a new biometric token 170 as described herein.

Figure 2A:
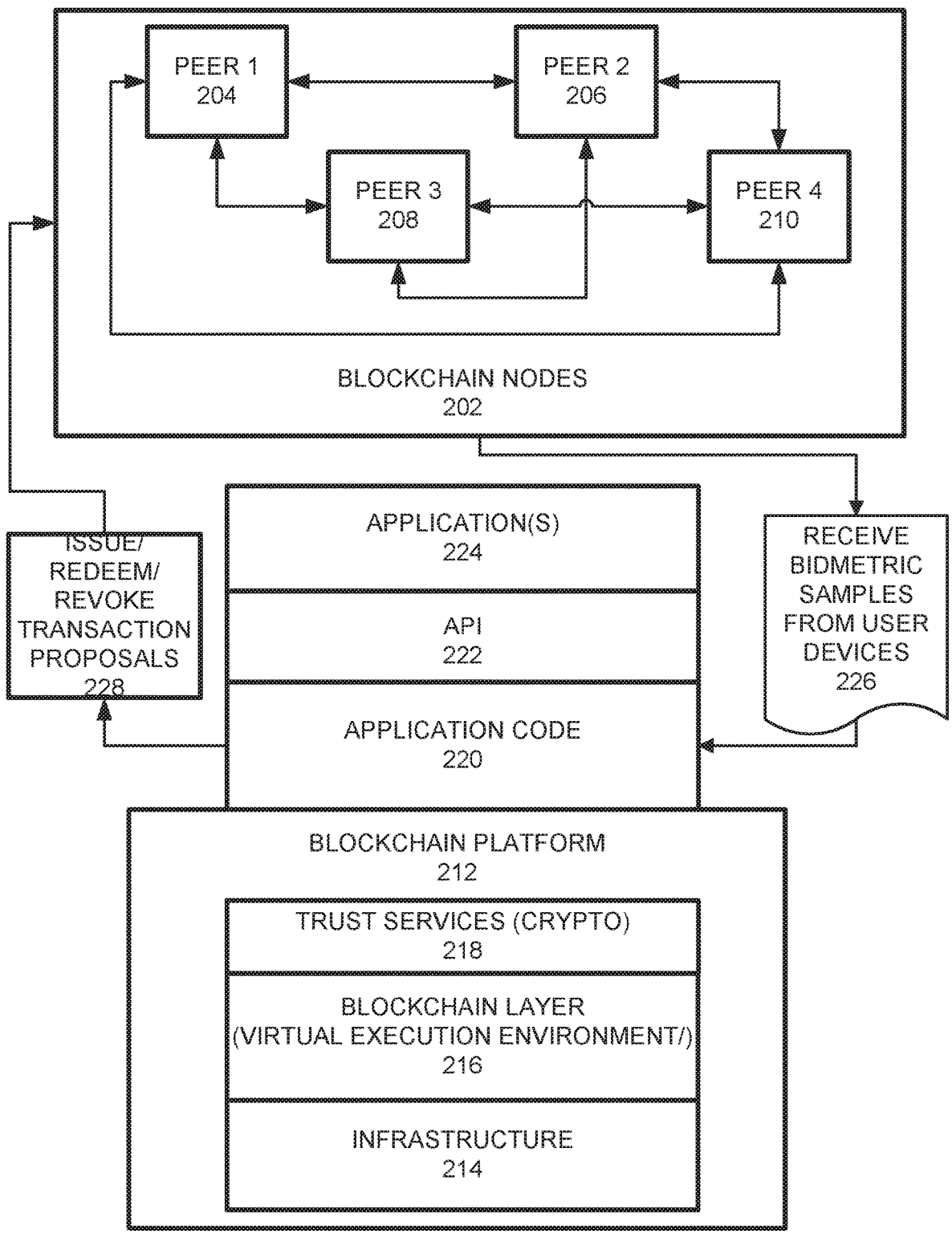
FIG. 2A illustrates an example peer node blockchain architecture configuration for an asset sharing scenario, according to example embodiments.

FIG. 2A illustrates a blockchain system architecture configuration 200, according to example embodiments. Referring to FIG. 2A, blockchain architecture 200 may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-281 may provide an ordering service for all blockchain nodes in the architecture 200. A blockchain node may initiate a blockchain authentication and seek to write to a blockchain immutable ledger stored in blockchain layer 220, a copy of which may also be stored on the underpinning physical infrastructure 210. The blockchain configuration may include one or applications 270 which are linked to application programming interfaces (APIs) 260 to access and execute stored program/application code 250 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 281-284.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, user biometric samples may be received from user devices 104 that may be processed by one or more processing entities (e.g., virtual machines) included in the blockchain layer 220. The result may include issue, redeem, or revoke transaction proposals that are provided to blockchain nodes 202.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In this example of FIG. 2A, transaction proposals 228 are generated to the blockchain nodes 202 as part of processes to issue, redeem, or revoke biometric tokens 170, 174.

Figure 2B:
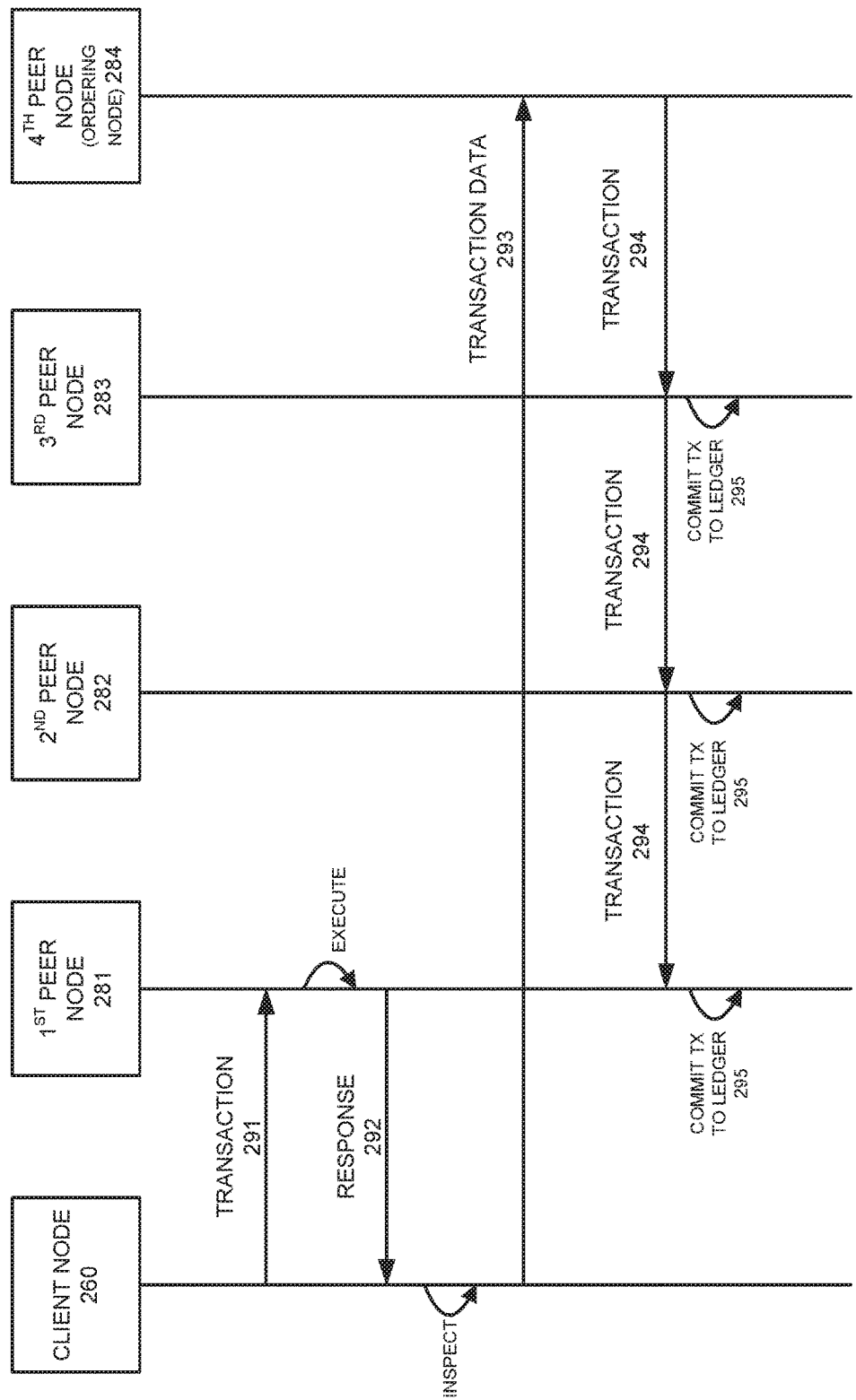
FIG. 2B illustrates an example of a transactional flow between nodes of the blockchain, according to example embodiments.

FIG. 2B illustrates an example of a transactional flow 250 between nodes of the blockchain in accordance with an example embodiment. Referring to FIG. 2B, the transaction flow 250 may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client node 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers or nodes 281-283 may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client node 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client node 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client node 260 which parses the payload for the application to consume.

In response, the application of the client node 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client node 260 may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by nodes and upheld at the commit validation phase.

After successful inspection, in step 293 the client node 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
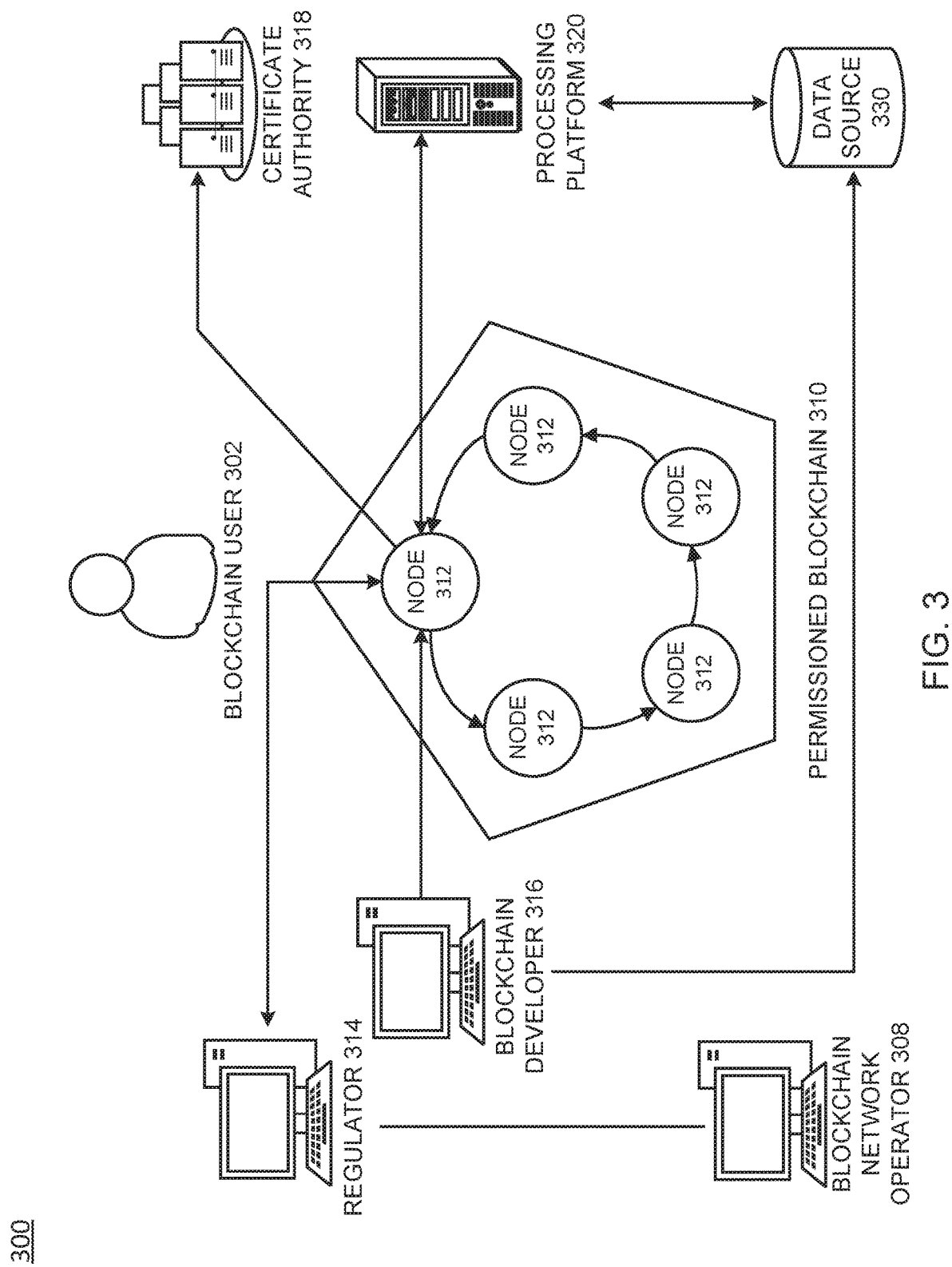
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
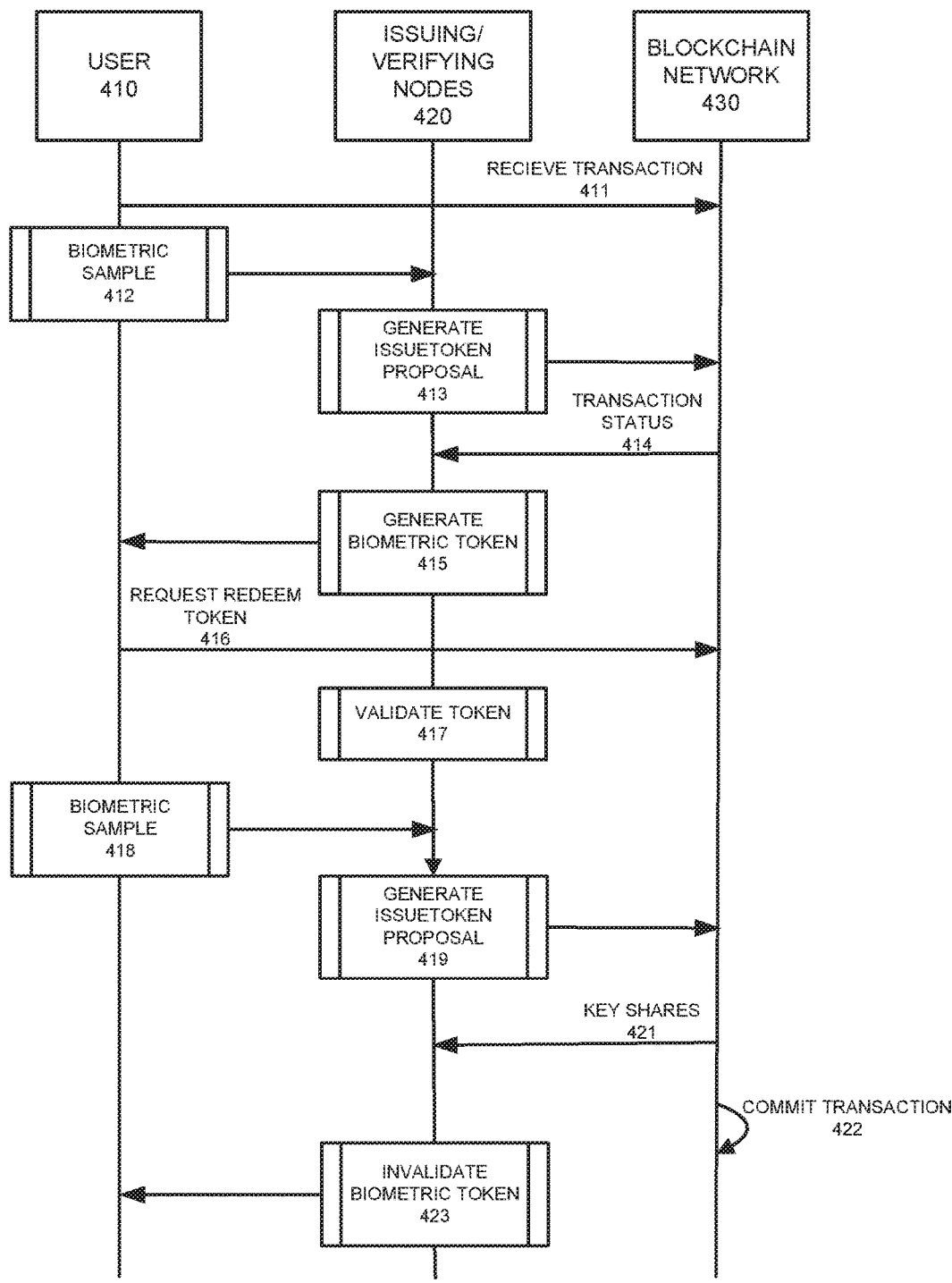
FIG. 4 illustrates a system messaging diagram for performing biometric token issuance and redemption, according to example embodiments.

FIG. 4 illustrates a system messaging diagram for performing biometric token issuance and redemption, according to example embodiments. Referring to FIG. 4, the system diagram 400 includes a user and user device 410, issuing/verifying nodes 420, and the permissioned blockchain network 430. User 410 begins the process by generating a blockchain transaction. The blockchain network 430 receives the transaction 411. The user 410 produces a first biometric sample 412 to an issuing node 420, which the issuing node 420 encrypts and sends as an issuetoken transaction proposal 413 to the blockchain network 430. The blockchain network 430 responsively provides transaction status 414 to the issuing node 420, which is used to generate a biometric token 415 to the user 410. The user device 410 stores the biometric token until the user 410 sends a request to redeem the biometric token 416 to the blockchain network 430. A verifying node 420 validates the token 417 and responsively generates a redeemtoken transaction proposal 419 to the blockchain network 430. The blockchain network 430 provides key shares 421 to the verifying node 420 and commits the transaction 422. Finally, with the transaction completed, the verifying node 420 invalidates the biometric token 423 to the user 410 so that it cannot be re-used.

Figure 5A:
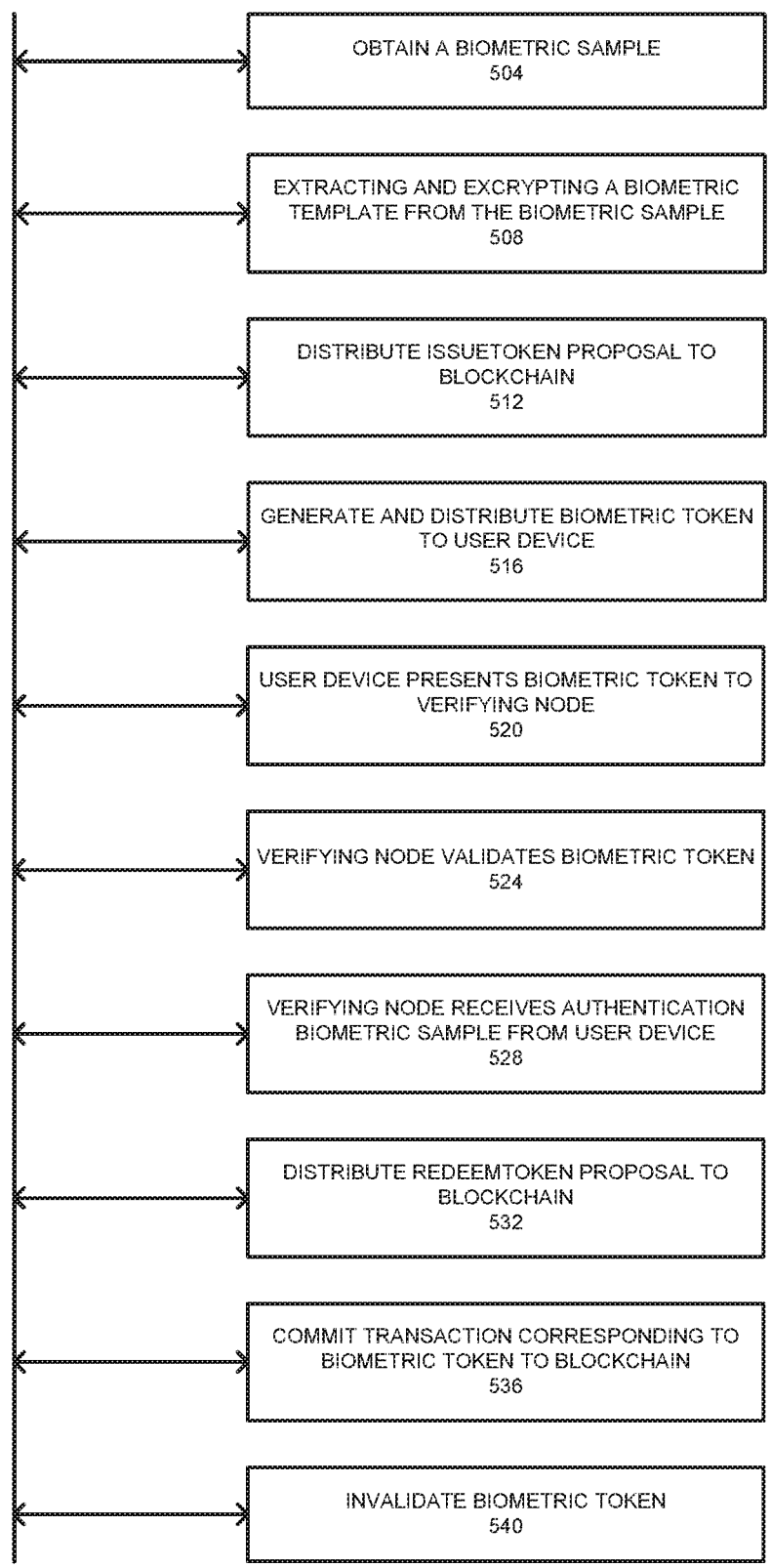
FIG. 5A illustrates a flow diagram of an example method of issuing and redeeming biometric tokens in a blockchain, according to example embodiments.

FIG. 5A illustrates a flow diagram of an example method of issuing and redeeming biometric tokens in a blockchain, according to example embodiments. Referring to FIG. 5A, the method 500 may include obtaining a biometric sample 504 from a user device 104. After receiving the biometric sample, an issuing node 120A extracts and encrypts a biometric template from the biometric sample 508. The issuing node 120A then generates and distributes an issuetoken transaction proposal to a permissioned blockchain network 512. After receiving back status from the blockchain network, the issuing node 120A generates and distributes a biometric token to the user device 516. The user device stores the biometric token until ready to redeem the biometric token. Nest, the user device presents the biometric token to a verifying node 520 and the verifying node validates the biometric token 524. The verifying node next requests and receives an authentication biometric sample from the user device 528, and uses that to create a redeemtoken transaction proposal and distribute the proposal to the permissioned blockchain 532. The blockchain network commits the transaction corresponding to the biometric token to the blockchain 536. Finally, the biometric token is invalidated 540 (i.e. it is a single-use biometric token).

Figure 5B:
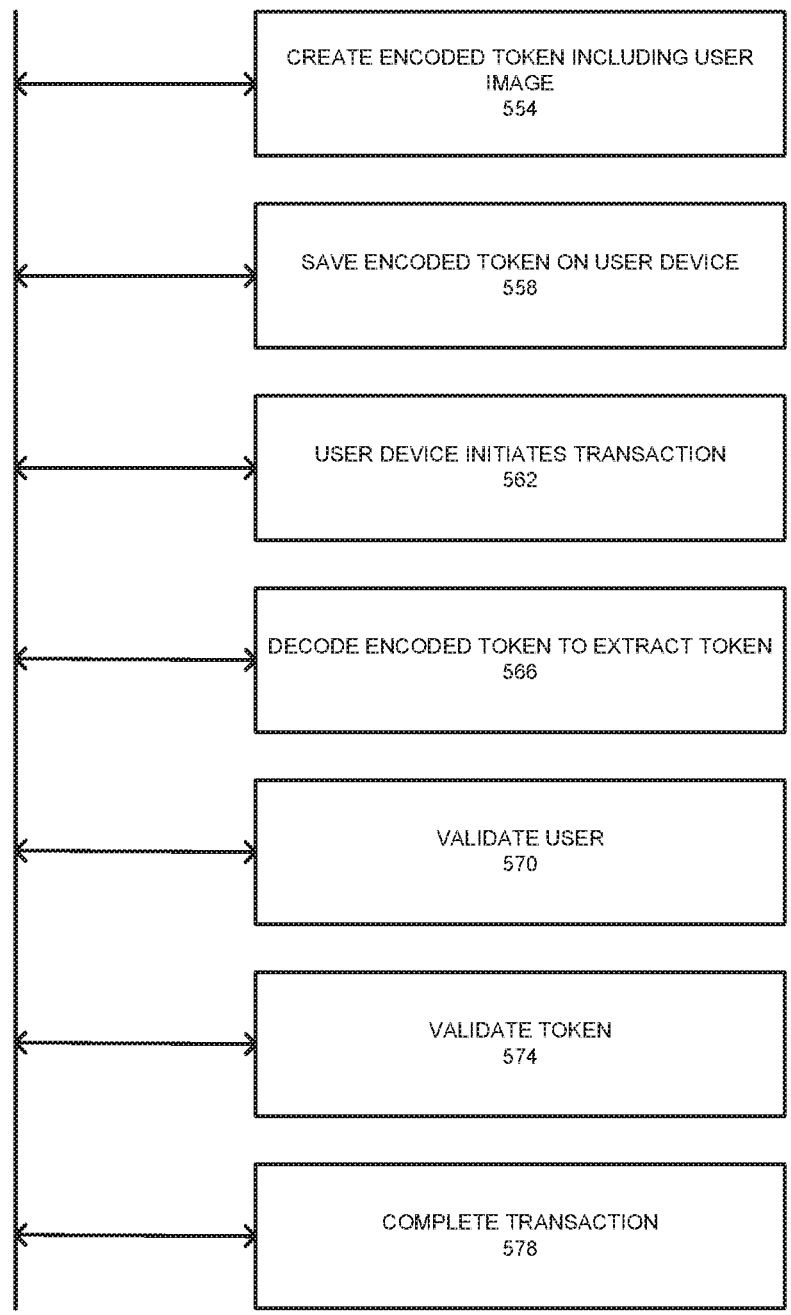
FIG. 5B illustrates a flow diagram of an example method of validating a biometric token for a transaction, according to example embodiments.

FIG. 5B illustrates a flow diagram of an example method of validating a biometric token for a transaction, according to example embodiments. The method may include creating an encoded token, including a user image, at block 554. A user uploads an image or chooses a randomly generated image from a library of images. A unique security token associated with the user's identity is generated. An encoder embeds the user's unique security token into the image selected or uploaded by the user. The result is a new image with the security token embedded therein. The image file is modified such that the embedded code is not detectable to the human eye, but it can be detected through a decoding module on a server system.

At block 558, the user downloads and saves the image file containing the embedded code into his or her client application, mobile application, or the like on the user's device. At this point, the stored encoded image is made available to the user through a drag-and-drop process in a graphical user interface (GUI). In one embodiment, a token is generated using a hashing algorithm, which employs a hash code or key generated based on features contained within the image, such as locations of identifiable objects (e.g., eyes and noses of human subjects), shapes of objects (e.g., a binary mask or chaincode of an object in an image), the inertia of an image, a low-pass filtering of an image, the Most Significant Bit of every pixel in a selected color plane (luminance, chrominance, Red, Green, Blue, etc.), or the like.

At block 562, the user initiates a transaction using the encoded token.

At block 566, a decoder process decodes the image file to authenticate the user's identity, which extracts the token from the received image. The application or decoder process transfers the token to the server component.

At block 570, the server component validates the user.

At block 574, the server component validates the token. The image file may be used to perform further user-level and/or device-level validation, which is performed in two substeps in this exemplary embodiment (although alternative embodiments may employ only one substep or different substeps): In the first substep, the hash extracted from the image file is compared with the hash code associated with the user. In the second substep, a second layer of validation is performed by comparing the Unique Device ID (UDID) of the device from which the transaction is triggered with the UDID associated with the encoded image. The objective for having double validation is to employ a device-dependent parameter that limits the transaction to the device with which the encoded image is associated. Additional levels of security may be added using a public-key encryption method to create a digital signature using one or more cryptography techniques such as RSA, DES, IDEA (international Data Encryption Algorithm), Skipjack or other block cipher techniques, discrete log systems (e.g., El Gamal Cipher), elliptic curve systems, cellular automata, etc. Public key cryptography systems may be used to implement a private and public key combination for additional security, in some embodiments of the application.

At block 578, once validation and authentication has been completed, the transaction is completed.

Figure 6A:
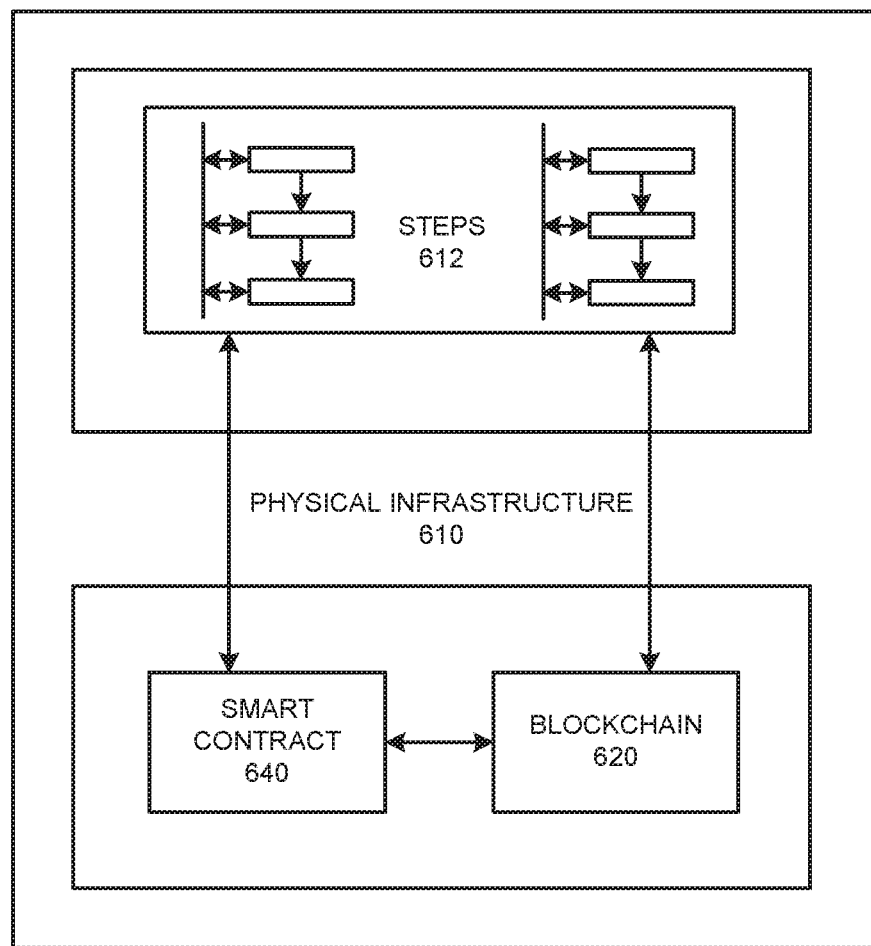
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
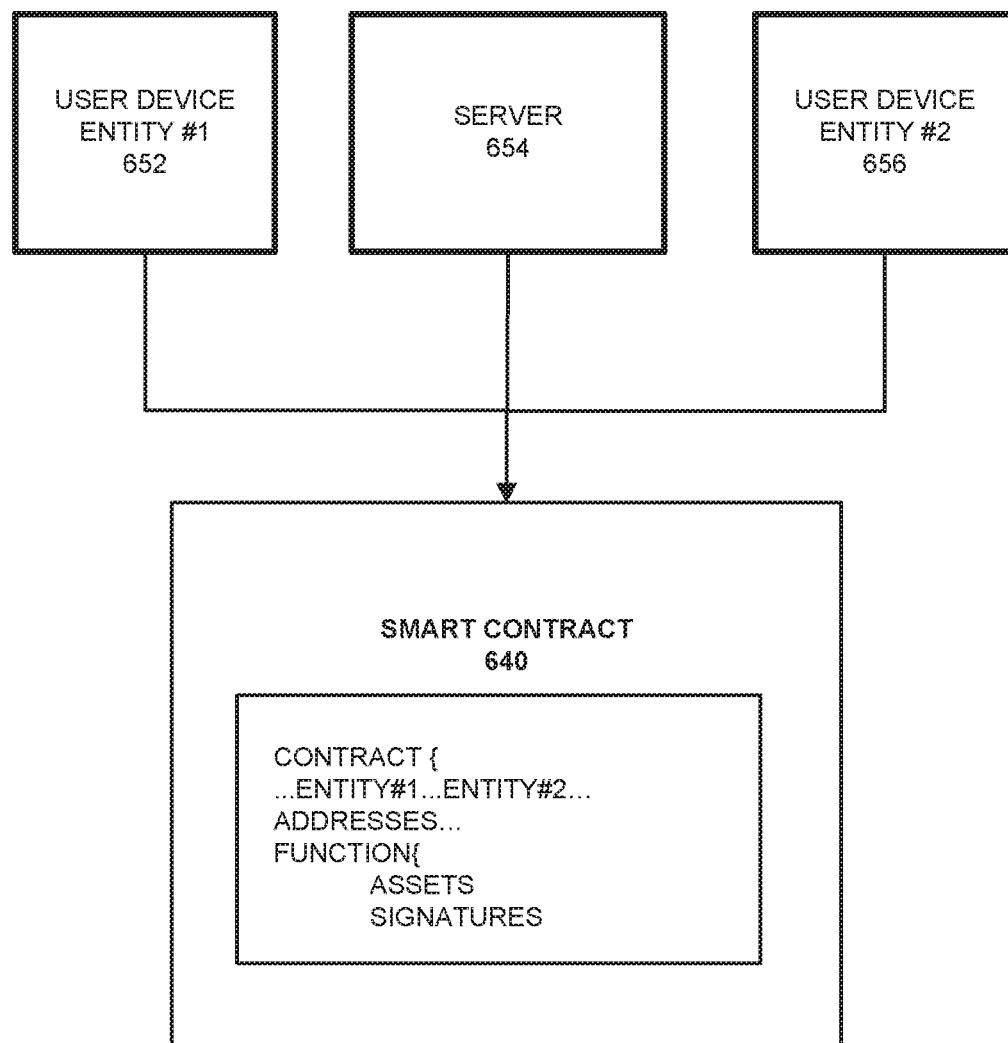
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
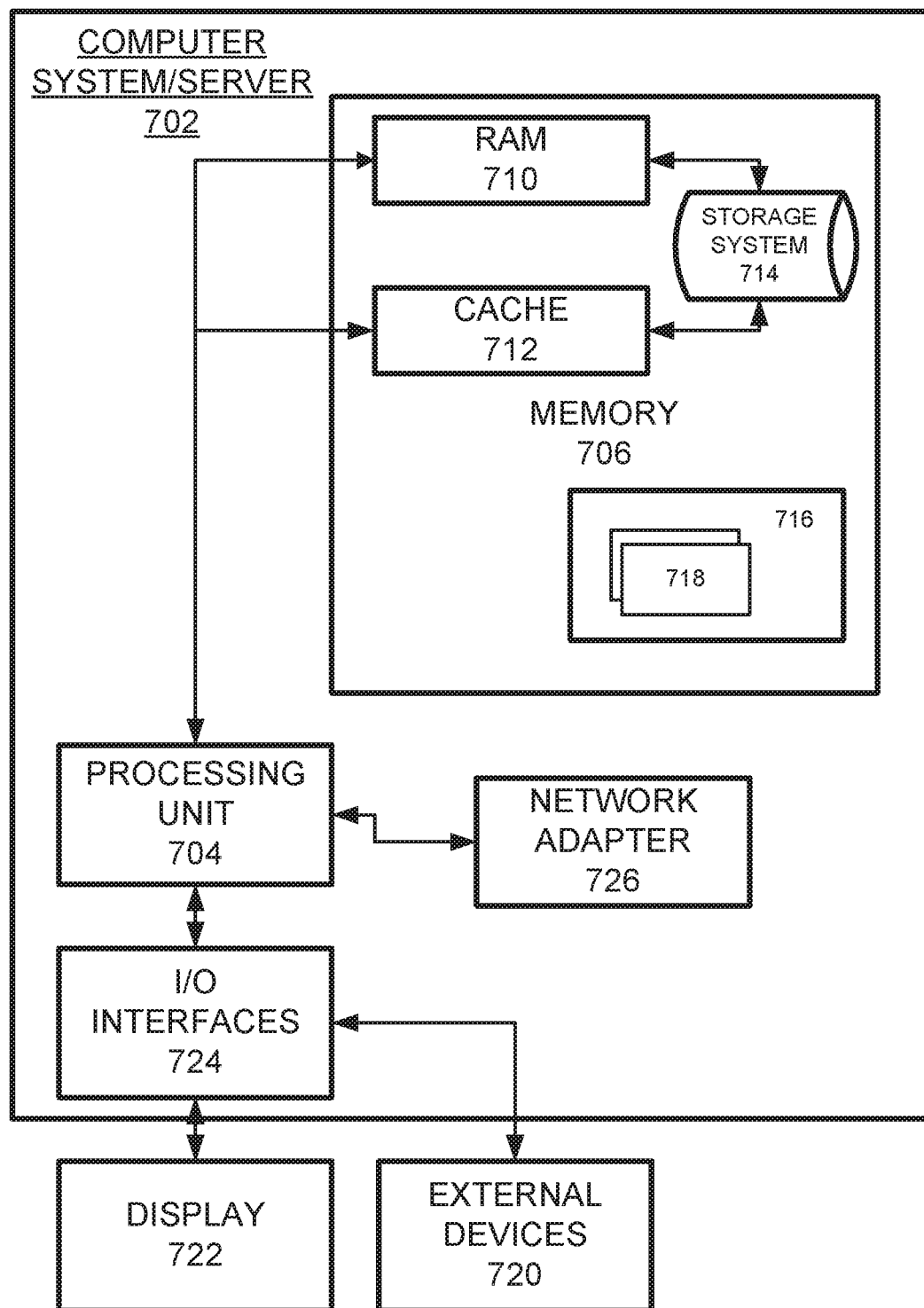
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include one or more program products having a set (e.g., one or more) of program modules that are configured to carry out the functions of various embodiments of the application.

Program/utility 716, having a set (one or more) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
  a processor; and
  a memory storing instructions which when executed by the processor cause the processor to:
    receive a first biometric sample from one or more biometric sensors of a user device;
    extract a biometric template from the first biometric sample and store the biometric template in the memory;
    encrypt the biometric template;
    generate a blockchain transaction that includes the encrypted biometric template, a time of expiry, and a token ID;
    receive signatures from a plurality of blockchain peers with respect to the generated blockchain transaction and record the blockchain transaction on a blockchain ledger in response to the signatures being received;
    encrypt metadata of the blockchain transaction to generate a biometric token associated with the token ID; and
    transmit the biometric token associated with the token ID to the user device.

2. The system of claim 1, wherein the blockchain transaction further comprises:
  an enrollment time corresponding to the first biometric sample.

3. The system of claim 2, wherein the processor is configured to encrypt transaction metadata comprising an issuing node identifier, a transaction identifier, the enrollment time, the expiry time, and the encrypted biometric template, and sign the encrypted transaction metadata using a private key, to generate the biometric token.

4. The system of claim 3, wherein the processor is further configured to:
  decrypt the transaction metadata;
  verify the biometric token has not expired based on the expiry time and the current time;
  verify, through the blockchain, the biometric token has not been redeemed or revoked; and
  verify a hash of the encrypted biometric template is the same as a hash stored in the blockchain.

5. The system of claim 3, wherein in response to receipt of a second biometric sample from the one or more biometric sensors, the processor is further configured to:
  extract a biometric query from the second biometric sample; and
  construct a redeem token proposal, the redeem token proposal comprising the token identifier, the transaction identifier, a request type, the enrollment time, the expiry time, and a cryptographic hash of the biometric query.

6. The system of claim 1, wherein in response to a request to cancel the transaction, the processor is further configured to:
  distribute a revoke token proposal to the blockchain; and
  cancel the transaction.

* * * * *